United States Patent [19]
Hayasaka et al.

[11] Patent Number: 5,801,868
[45] Date of Patent: Sep. 1, 1998

[54] APPARATUS FOR AND METHOD OF LASER MAKING

[75] Inventors: Kazuhiro Hayasaka; Masashi Ichihara, both of Hiratsuka, Japan

[73] Assignee: Komatsu Ltd., Tokyo, Japan

[21] Appl. No.: 648,031

[22] PCT Filed: Nov. 15, 1994

[86] PCT No.: PCT/JP94/01928

§ 371 Date: May 20, 1996

§ 102(e) Date: May 20, 1996

[87] PCT Pub. No.: WO95/13899

PCT Pub. Date: May 26, 1995

[30] Foreign Application Priority Data

Nov. 19, 1993 [JP] Japan ................... 5-312875

[51] Int. Cl.⁶ .................................. G02B 26/08
[52] U.S. Cl. .............. 359/202; 359/201; 219/121.73
[58] Field of Search ..................... 359/201–202, 359/210, 212–219, 871; 347/224, 225, 256–261, 110; 219/121.73, 121.74, 121.75, 121.77–121.82, 121.68, 121.69

[56] References Cited

U.S. PATENT DOCUMENTS

| 4,746,202 | 5/1988 | Perilloux et al. |
|---|---|---|
| 5,309,273 | 5/1994 | Mori et al. ............... 359/202 |
| 5,605,641 | 2/1997 | Chiba et al. ............. 219/121.68 |

FOREIGN PATENT DOCUMENTS

| 285097 | 10/1988 | European Pat. Off. |
|---|---|---|
| 495647 | 7/1992 | European Pat. Off. |
| 4102936 | 8/1992 | Germany |
| 57-14981 | 1/1982 | Japan |
| 57-81984 | 5/1982 | Japan |
| 60-227994 | 11/1985 | Japan |
| 1-11083 | 1/1989 | Japan |
| 2-15887 | 1/1990 | Japan |
| 2-96714 | 4/1990 | Japan |
| 2-187288 | 7/1990 | Japan |
| 2-187289 | 7/1990 | Japan |
| 2-251387 | 10/1990 | Japan |
| 5-42379 | 2/1993 | Japan |
| 94/12310 | 6/1994 | WIPO |

*Primary Examiner*—James Phan
*Attorney, Agent, or Firm*—Sidley & Austin

[57] ABSTRACT

An apparatus for and a method of laser marking make it possible to perform laser marking on workpieces being continuously conveyed, without having to stop them at intervals, thereby achieving an improvement in production efficiency. For this purpose, the marking apparatus has a second deflector (9) which includes a mirror (10), for reflecting a laser beam transmitted through a mask (6), and movable lenses (16, 17) for receiving the reflected laser beam from the reflective mirror (10) and applying it to the surface of a workpiece (8) for marking, with the movable lenses (16, 17) being mounted on a moving mechanism (15) which moves in synchronism with the speed at which the workpiece is conveyed.

17 Claims, 9 Drawing Sheets

APPARATUS FOR AND METHOD OF LASER MAKING

TECHNICAL FIELD

The present invention relates to an apparatus for and a method of laser marking and, in particular, to an apparatus for and a method of performing marking continuously on a plurality of objects to be marked while the objects are moving.

BACKGROUND ART

When marking patterns, consisting of any characters, symbols, figures, designs, etc., on workpieces formed of metal, plastic, ceramic, paper, cloth, etc., manufactured by production lines in plants, it has been general practice to use an ink-jet system (See, for example, Japanese Patent Laid-Open No. 57-14981). In this system, recording is effected while varying the positional relationship between the workpiece and the nozzle of an ink jet by means of a conveying device, so that an interlock between the conveying device and the ink jet is indispensable.

However, as the miniaturization of semiconductor products, etc., proceeds, the marks to be recorded are now required to be smaller and more precise. Under the circumstances, attention is being given to a laser marking apparatus as an alternative to the ink-jet system. In a suitable example of the laser marking apparatus, raster scanning is performed on the surface of a mask with a laser beam from a laser generator by means of a deflector to thereby effect marking on the surface of a workpiece with the laser beam transmitted through the mask, which has a predetermined pattern.

However, in the above-described laser marking apparatus, in which the laser beam transmitted through the mask is deflected toward the workpiece conveying line, the beam application area is stationary, and a workpiece is temporarily brought to a stop upon reaching this application area, so that the laser beam can be applied to the surface of the workpiece to thereby effect marking thereon, which is thus caused to stay. Thus, it is necessary for the conveying line to be stopped each time a marking operation is performed on a workpiece, resulting in a rather poor productivity.

SUMMARY OF THE INVENTION

The present invention has been made with a view toward eliminating the above problem in the prior art. It is accordingly an object of the present invention to provide an apparatus for and a method of laser marking in which marking can be effected on workpieces being continuously conveyed, without having to bring them to a stop at intervals, whereby it is possible to achieve an improvement in terms of production efficiency.

A laser marking apparatus according to the present invention includes a second deflector having a mirror for reflecting a laser beam transmitted through a mask and movable lenses for receiving the laser beam from this reflective mirror and applying it to the surface of a workpiece for marking, with the movable lenses being mounted on a moving mechanism which moves in synchronism with the speed at which the workpiece is conveyed. The reflective mirror is composed of a first mirror for receiving and reflecting the laser beam transmitted through the mask and a second mirror for reflecting the reflected beam from the first mirror to the movable lenses, with the direction of the reflected beam from the first mirror being switchable with respect to the second mirror or the movable lenses. Further, the reflective mirror can be composed of a movable mirror for receiving and reflecting the laser beam transmitted through a mask, a rotating mirror which reflects the reflected beam from the movable mirror to the movable lens and which is capable of planar rotation, and a stationary mirror capable of receiving the reflected beam due to the displacement of the movable mirror and reflecting it to the rotating mirror, with the direction of the reflected beam from the movable mirror being switchable, through displacement of the movable mirror, to the rotating mirror or to the stationary mirror. Further, the above-mentioned reflective mirror can be composed of a first mirror for receiving and reflecting laser beam transmitted through a mask, a second mirror for reflecting the reflected beam from the first mirror to movable lenses, a third mirror for receiving and reflecting the laser beam transmitted through the mask, a fourth mirror for receiving and reflecting the reflected beam from the third mirror to the movable lenses, and a fifth mirror for reflecting the reflected beam from the fourth mirror to the movable lenses, with the first through fifth mirrors being secured to a movable base, and the laser beam transmitted through the mask being switchably applied to the first mirror or to the third mirror through displacement of this movable base. Further, the abovementioned moving mechanism can be formed by an orthogonal biaxial planar moving mechanism, with one of the two orthogonal axes coinciding with the workpiece conveying direction, and the drive in that axis being effected in synchronism with the workpiece conveying speed.

A laser masking method according to the present invention is characterized in that, when applying a laser beam to the surface of a workpiece for marking, movable lenses for applying a beam to the surface of the workpiece, which are provided in a second deflector, are moved in synchronism with the workpiece being conveyed, in the workpiece conveying direction. Further, the second deflector can swing a laser beam transmitted through a mask by at least 90° between the mask and the movable lenses. Further, the second deflector can be equipped with a movable mirror for deflecting a beam transmitted through the mask toward the movable lenses and a stationary mirror for receiving the reflected beam from this movable mirror, with the reflected beam from the movable mirror being switchably emitted to the stationary mirror or to the movable lenses, to thereby make the mask pattern rotatable.

In the apparatus for and method of laser marking described above, a more flexible planar positioning of mask information obtained by the first deflector is possible by means of the second deflector. That is, the laser beam containing mask information can be displaced in a two-dimensional plane in synchronism with the conveying device, without requiring any change on the workpiece-conveying-device side. Due to this arrangement, it is possible for the laser marking apparatus to have a higher degree of freedom, whereby the load on the conveying device can be diminished. Thus, an improvement is achieved in terms of general versatility, and a reduction in workpiece production tact time due to the marking operation can be prevented.

BEST MODE FOR CARRYING OUT THE INVENTION

Preferred embodiments of the apparatus for and the method of laser marking of the present invention will now be described in detail with reference to the accompanying drawings.

Figure 1:
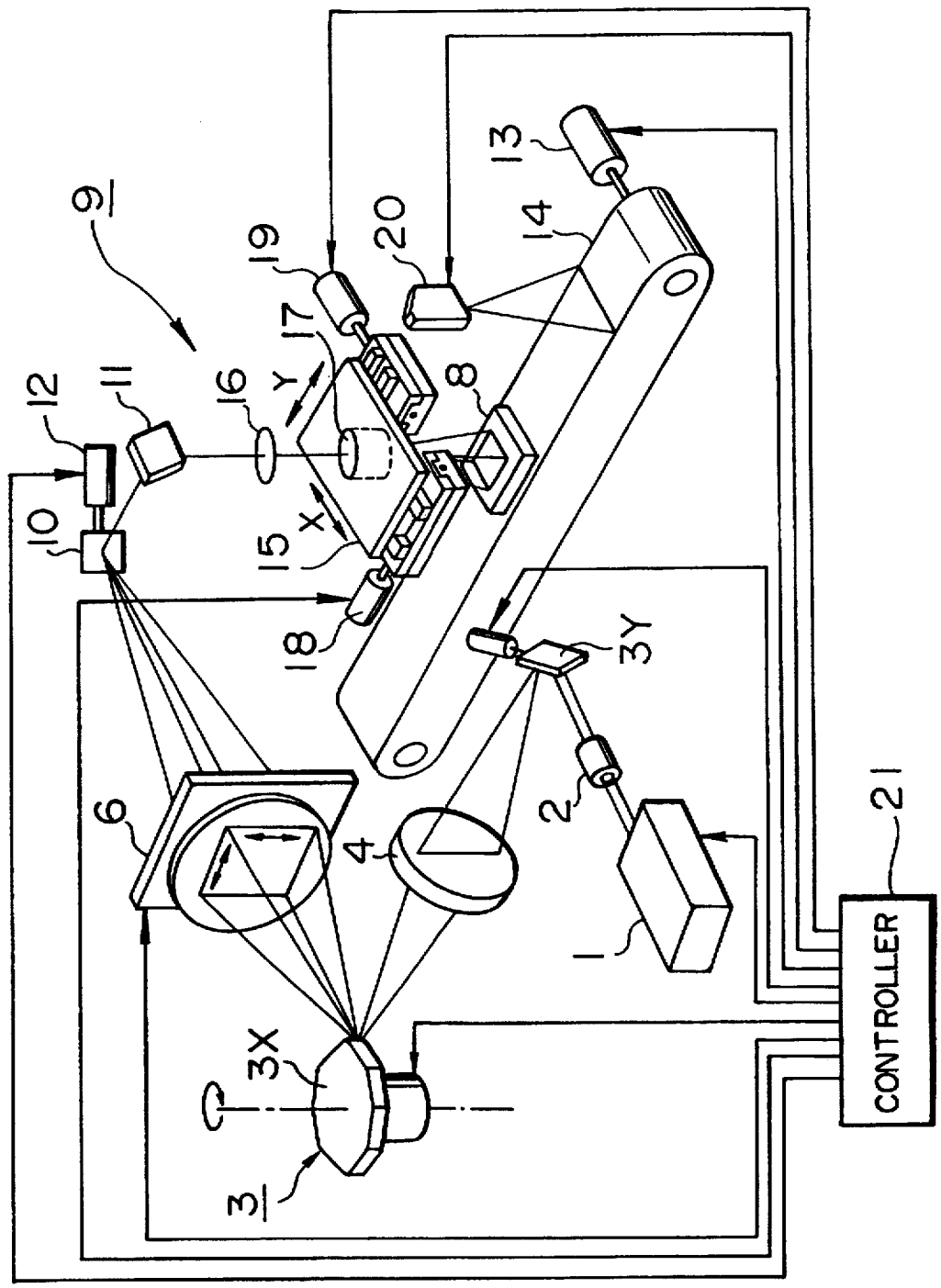
FIG. 1 is a diagram illustrating the construction of a laser marking apparatus according to a first embodiment of the present invention.

FIG. 1 is a diagram showing the construction of a laser marking apparatus according to the first embodiment, which includes a YAG laser generator 1 serving as a laser beam source. This apparatus is equipped with a first deflector 3 (3X, 3Y) for deflecting a laser beam from the YAG laser generator 1 in the X- and Y-directions for raster scanning after it has been condensed by an optical lens 2. In an intermediate section of this first deflector 3, there is arranged an optical system 4 for condensing the laser beam, deflected by the Y-direction deflector 3Y, at a point on a reflecting surface of the X-direction deflector 3X.

The first deflector 3 (3X, 3Y) comprises a polygon mirror 3X, which serves as the X-direction deflector, and a rotating operation mirror 3Y, which serves as the Y-direction deflector, with their axes of rotation being orthogonal to each other. These mirrors are spaced apart from each other. The polygon mirror 3X, which is formed as a polyhedron having thirty-six surfaces, is rotatable in constant-speed rotation modes of several steps, an optimum mode being selected for each workpiece 8. That is, one surface of the polygon mirror 3X corresponds to one line in the X-direction on a liquid crystal mask described below, and one rotation of the polygon mirror 3X corresponds to thirty-six lines in the X-direction.

The rotating operation mirror 3Y is designed such that, as the polygon mirror 3X rotates to cause the laser beam receiving point to shift from one surface to another, the mirror 3Y rotates by a minute angle and then stops. In this embodiment, the rotating operation mirror 3Y operates by minute equal angles of forty-three steps. After the last, i.e., the forty-third step, the mirror 3Y makes a reverse rotation to return at a stroke to the first step. Although it might be possible to adopt a system in which the twenty-second step constitutes a neutral position, this embodiment adopts a system in which the first step constitutes the neutral position so as to be in conformity with the raster scanning start position. Thus, in this embodiment, one minute rotational angle of the rotating operation mirror 3Y corresponds to a line feed in the Y-direction on the liquid crystal mask, the rotating operation mirror 3Y making a rotation by one minute rotational angle each time the application of a beam to one surface of the polygon mirror 3X is completed. Until the application of the beam to one surface has been completed, the rotating operation mirror 3Y rests at the same position.

Further, there is provided a liquid crystal mask 6, which receives the laser beam for use in raster scanning by the first deflector 3, and which is capable of arbitrarily displaying patterns, causing them to be transmitted or scattered electrically. Due to this liquid crystal mask 6, it is possible to form a desired mark pattern. The liquid crystal mask 6 is of a type which is generally called a transmission/scattering-type liquid crystal mask, an example of which is a "liquid-crystal/resin complex composed of liquid crystal and resin (See Japanese Patent Laid-open No. 2-96714)".

In this liquid crystal mask, a multitude of parallel electrode lines are provided on either side of the liquid crystal and in such a way as to cross each other between the obverse and reverse sides. In those portions of the liquid crystal to which no voltage is being applied, the laser beam is scattered, whereas those portions of the liquid crystal to which voltage is being applied are in a laser beam transmitting state. By utilizing this electrical characteristic, voltage is selectively applied to the electrodes to thereby form a desired pattern into an image instantaneously. Unlike conventional liquid crystal masks, this liquid crystal mask 6 does not require a polarizer. Thus, the intensity of the laser beam transmitted through the liquid crystal mask 6 is at least two times as high as that of the conventional liquid crystal masks. In this embodiment, the liquid crystal mask 6 has 24×24 dots, displaying different divisional patterns in dot matrix. Apart from this, it is possible for this liquid crystal mask 6 to have various other types of dot matrix, for example, 72 dots×36 dots.

On the output side of the liquid crystal mask 6, there is provided a second deflector 9 for deflecting the laser beam, transmitted in conformity with the pattern to be formed, toward the surface of the workpiece 8, which is the object of marking. This second deflector 9 comprises a first deflecting mirror 10 for receiving and reflecting the laser beam transmitted through the liquid crystal mask 6, and a second deflecting mirror 11 for reflecting the reflected beam, from the first deflecting mirror 10, toward a group of lenses described below. In this case, the first reflecting mirror 10 is designed such that its reflecting direction is switchable, i.e., it can be directly reflected to the above-mentioned group of lenses or indirectly thereto through the intermediation of the second deflecting mirror 11. For this purpose, the first deflecting mirror 10 is designed so as to be capable of being rotated by a mirror driving motor 12, whereas the second deflecting mirror 11 is formed as a stationary mirror which is positioned such that it deflects toward the group of lenses.

As described above, there are provided a group of lenses for receiving deflected laser beam directly from the first deflecting mirror 10 or indirectly through the second deflecting mirror 11. The group of lenses are arranged above a conveying device 14 for conveying the workpiece 8, which device consists of a belt conveyor or the like. The group of lenses form an optical system, which is mounted on an XY table 15 that is formed so as to be capable of making planar movements along the conveying plane of the conveying device 14, and thus the group of lenses can make planar movements. This table 15 has an orthogonal biaxial planar moving mechanism. The movable group of lenses, mentioned above, are composed of an objective lens 16 and a marking lens 17. The objective lens 16 is arranged above the surface of the table 15 and moves integrally with the table 15. The objective lens 16 serves to receive the laser beam from the first deflecting mirror 10 or the second deflecting mirror 11 and effect focusing of the formed image.

The marking lens 17 has an optical axis which coincides with that of the objective lens 16, and is secured in position within a through-hole section of the table 15 to perform pattern marking on the workpiece 8, passing under the table 15. Further, to enable the table to move, the table 15 is equipped with a Y-direction motor 18 for driving it in conformity with the conveying direction of the workpiece 8 and an X-direction motor 19 for driving it in a direction perpendicular thereto. Thus, the table 15 is capable of making planar movements in composite driving directions due to these motors 18 and 19.

Further, on the upstream side of the workpiece conveying device 14, there is provided a workpiece position detector 20, for detecting the presence of any workpiece 8 on the conveying device 14. Further, there is provided a controller 21 for overall control of all of the above-described driving units. This controller 21 generates a marking pattern signal to cause a laser beam transmission image corresponding to a pattern to be formed in the liquid crystal mask 6, drives the first deflector 3 so as to effect raster scanning on the surface of the liquid crystal mask 6 with the laser beam. To set the direction in which the marking of the pattern on the surface of the workpiece 8 is to be effected, the controller 21 determines the deflecting direction of the first deflecting mirror 10 and, on the basis of this direction, drives the mirror driving motor 12. Further, the controller 21 inputs a signal from the workpiece position detector 20 and, when the workpiece 8 reaches the marking position, starts the Y-direction motor 18 so as to effect a synchronized movement in the conveying direction, causing laser marking to be performed while the workpiece 8 is being conveyed.

Figure 2:
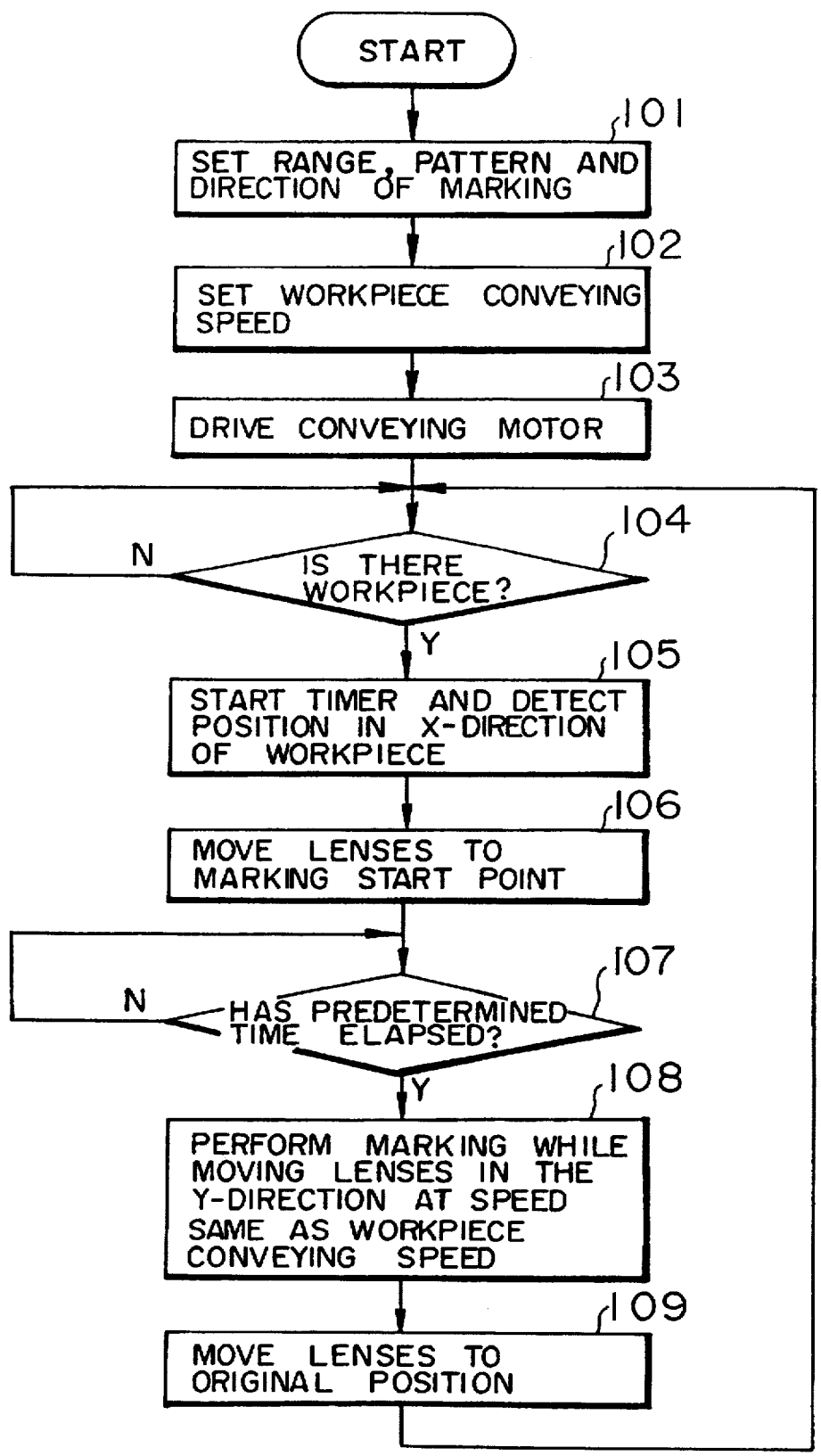
FIG. 2 is a flowchart illustrating the operation of the apparatus of FIG. 1.
Figure 3A:
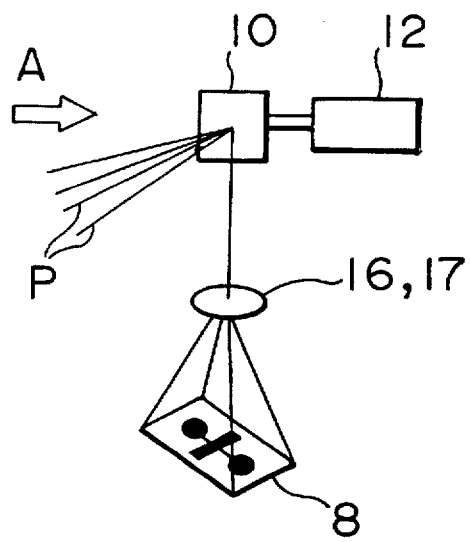
FIG. 3A is a diagram illustrating how laser beam from a first deflecting mirror according to the first embodiment are directly deflected to movable lenses.
Figure 3B:
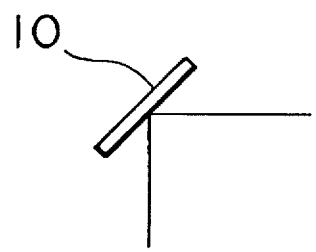
FIG. 3B is a diagram showing FIG. 3A from the direction of an arrow A.
Figure 4A:
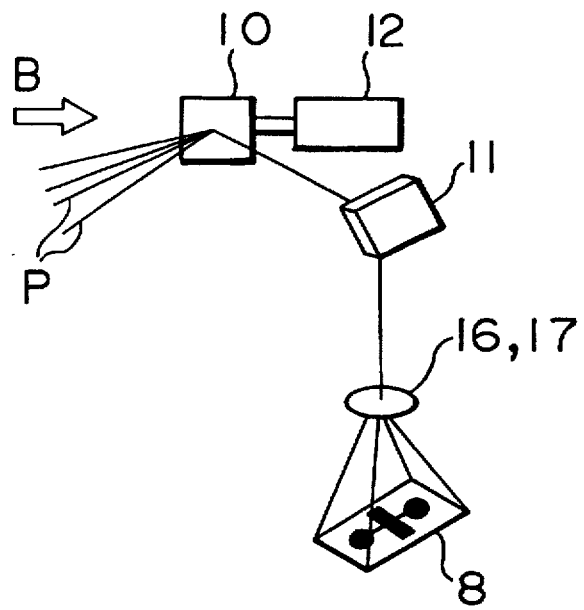
FIG. 4A is a diagram illustrating how laser beam from the first deflecting mirror of the first embodiment are deflected to the movable lenses through a second deflecting mirror.
Figure 4B:
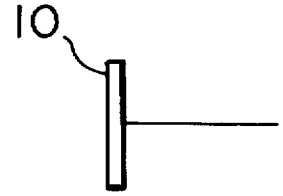
FIG. 4B is a diagram showing FIG. 4A from the direction of an arrow B.

A marking method using the above-described construction will be described. Referring to FIG. 2, which shows a control flow, the pattern to be marked and the range and the direction thereof are set (step 101). Regarding the marking direction, the first deflecting mirror 10 is inclined by the mirror driving motor 12 as shown in FIGS. 3A and 3B so as to adjust its deflecting direction to the movable lenses 16 and 17 below, whereby the laser beam P is deflected in a direction perpendicular to the workpiece 8. As a result, a pattern as shown, is marked-on the surface of the workpiece 8. Next, as shown in FIGS. 4A and 4B, the first deflecting mirror 10 is set to a vertical position by the mirror driving motor 12, whereby the laser beam P is deflected so as to be parallel to the surface of the workpiece 8 and impinge upon the second deflecting mirror 11. The second deflecting mirror 11 is fixed in a position in which it is directed downwardly, so that the laser beam P are deflected in a direction perpendicular to the workpiece 8. As a result, a pattern obtained by turning the pattern shown in FIG. 3A by 90° with respect thereto is marked on the surface of the workpiece 8. That is, by driving the conveying device 14 to move the workpiece 8 to a position directly below the first or second deflecting mirror 10 or 11, it is possible to arbitrarily select the direction of the marking pattern solely by controlling the mirror driving motor 12.

Next, the conveying speed of the workpiece 8 is set (step 102). Since the range in which marking by the laser marking apparatus is possible is restricted, it is necessary to perform marking of a pattern within that range. In view of this, the speed at which the workpiece 8 is conveyed is determined in accordance with the size and the direction of the marking range.

After these preparatory operations, the motor 13, for driving the conveying device 14, is started (step 103). After the start of the motor 13, the operation for detecting the presence of the workpiece 8 is continuously performed (step 104) by the workpiece position detector 20, which is associated with the conveying device 14, for the purpose of checking the timing of the conveyance of the workpiece 8 into the marking range, the procedure advancing to the next step upon detection of a workpiece 8.

After a workpiece 8, which is being conveyed by the conveying device 14, is detected by the workpiece position detector 20, an internal timer of the controller 21 is started, and the detection of the conveying direction and the vertical position of the workpiece 8 is effected by the workpiece position detector 20 (step 105). Then, by operating the XY table 15, the movable lenses 16 and 17 are moved to a marking start point (step 106). The marking start point is the stroke end on the upstream side within the marking-possible range with respect to the conveying direction of the workpiece 8, whereas, with respect to the direction orthogonal to the conveying direction, it is the position detected by the detector 20 in step 105.

After the movable lenses 16 and 17 have been brought to the marking start position, the apparatus enters into a stand-by state, which continues for a period until the workpiece 8 is conveyed to the marking position. This period is uniformly determined by the distance between the workpiece position detector 20 and the marking- possible range and the conveying speed, and is compared with the lapse of time as indicated by the internal timer of the controller 21 (step 107).

Figure 5:
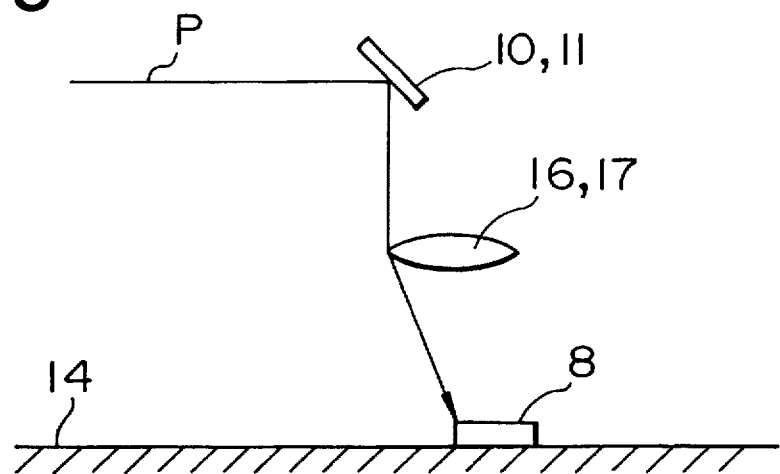
FIG. 5 is a diagram illustrating how marking is started according to the first embodiment.
Figure 6:
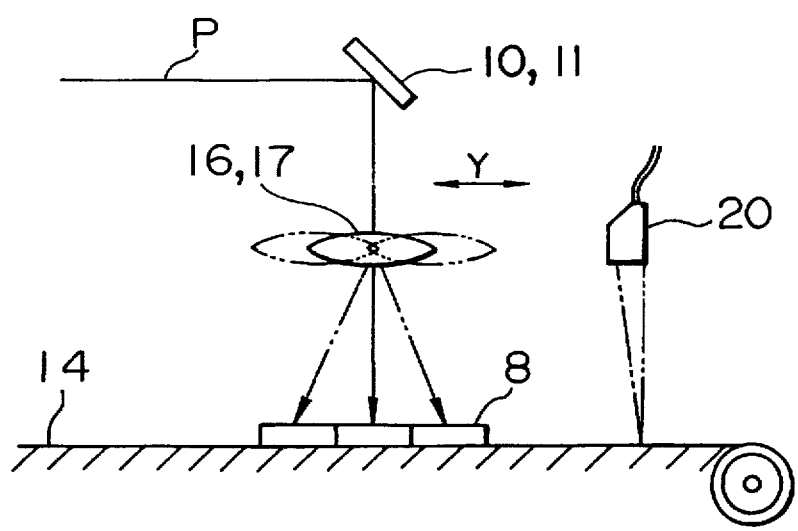
FIG. 6 is a diagram illustrating how the movable lenses of the first embodiment are synchronized to a conveying device.
Figure 7:
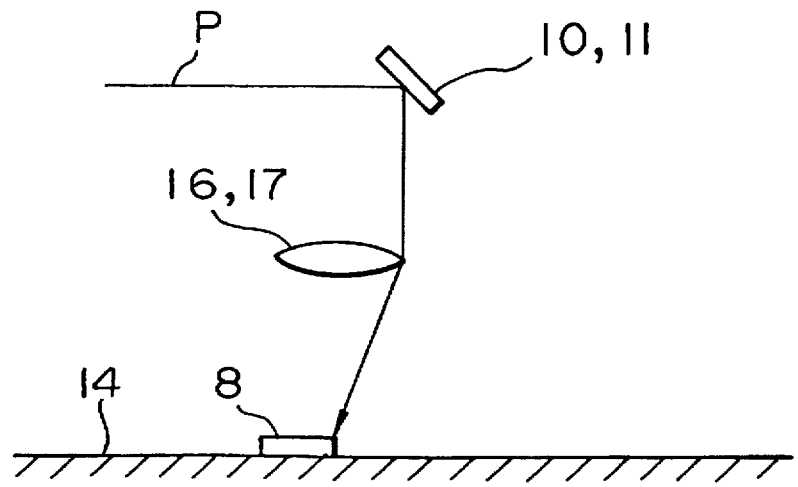
FIG. 7 is a diagram illustrating how marking is completed according to the first embodiment.

After the elapse of the predetermined stand-by period, that is, when the workpiece 8 has reached the marking start point, marking is started (step 108). This condition is shown in FIG. 5. While keeping the conveying speed of the workpiece 8 constant, the marking position is moved relative to the workpiece 8 in synchronism therewith, whereby the surface of the workpiece 8 is marked with a fixed pattern. The synchronization of the marking position is effected by the Y-direction motor 18 of the XY-table 15. That is, as shown in FIG. 6, driving is performed such that the speed of the movement of the lenses 16 and 17 and the conveying speed of the workpiece 8 can be kept equal to each other. By this synchronized movement, marking of a fixed pattern is effected, with which the marking operation on one workpiece 8 is completed (See FIG. 7).

After the completion of the marking of one workpiece 8, the lenses 16 and 17 are moved to the upstream side so as to be prepared for marking on subsequent workpieces 8, which are to be fed one after another (step 109), and the procedure returns to step 104 to repeat the same operations. In this way, laser marking can be performed on the workpieces 8 even when they are being continuously conveyed, without having to stop their conveyance.

In accordance with this embodiment, described above, it is possible to effect marking of an arbitrary pattern on the surface of a workpiece 8 being conveyed, due to the action of the second deflector 9. In particular, in performing marking, selection is possible with regard to planar translational position and two rotating directions. Further, it is only necessary for the speed in the conveying direction of the conveying device 14 to have at least one degree of freedom, so that marking is possible while continuously operating the conveying device 14. Thus, the load on the conveying device 14 is diminished, whereby an enhancement in general versatility is attained and, at the same time, a reduction in the tact time for workpiece production is achieved, thereby making it possible to achieve an improvement in terms of production efficiency.

Next, the second embodiment of the present invention will be described in detail with reference to the drawings.

This embodiment differs from the first embodiment in the construction of the reflective mirror of the second deflector (See FIG. 1). In the first embodiment, the first deflecting mirror 10 and the second deflecting mirror 11 are used for the purpose of effecting planar rotation by 90° of the marking pattern, whereas, in this embodiment, a rotating mirror 25, a movable mirror 26 and a stationary mirror 27 are used, as shown in FIG. 8.

First, the optical path for the laser beam will be described as being divided into two paths. In a first optical path, the laser beam P transmitted through the liquid crystal mask 6 is reflected by the movable mirror 26 and the reflected beam therefrom is reflected by the rotating mirror 25 and, further, the beam thus reflected is applied to the movable lenses 16 and 17. In a second optical path, the rotating mirror 25 in the first optical mirror rotates, and the movable mirror 26 moves, whereby the laser beam P, transmitted through the liquid crystal mask 6, is reflected by the movable mirror 26, and the beam thus reflected is reflected by the rotating mirror 25, the reflected beam therefrom being applied to the movable lenses 16 and 17. The second optical path is constructed such that the stationary mirror 27 exists in the first optical path, so that the beams applied to the movable lenses 16 and 17 through the first and second optical paths are deviated from each other by 90°.

Figure 8:
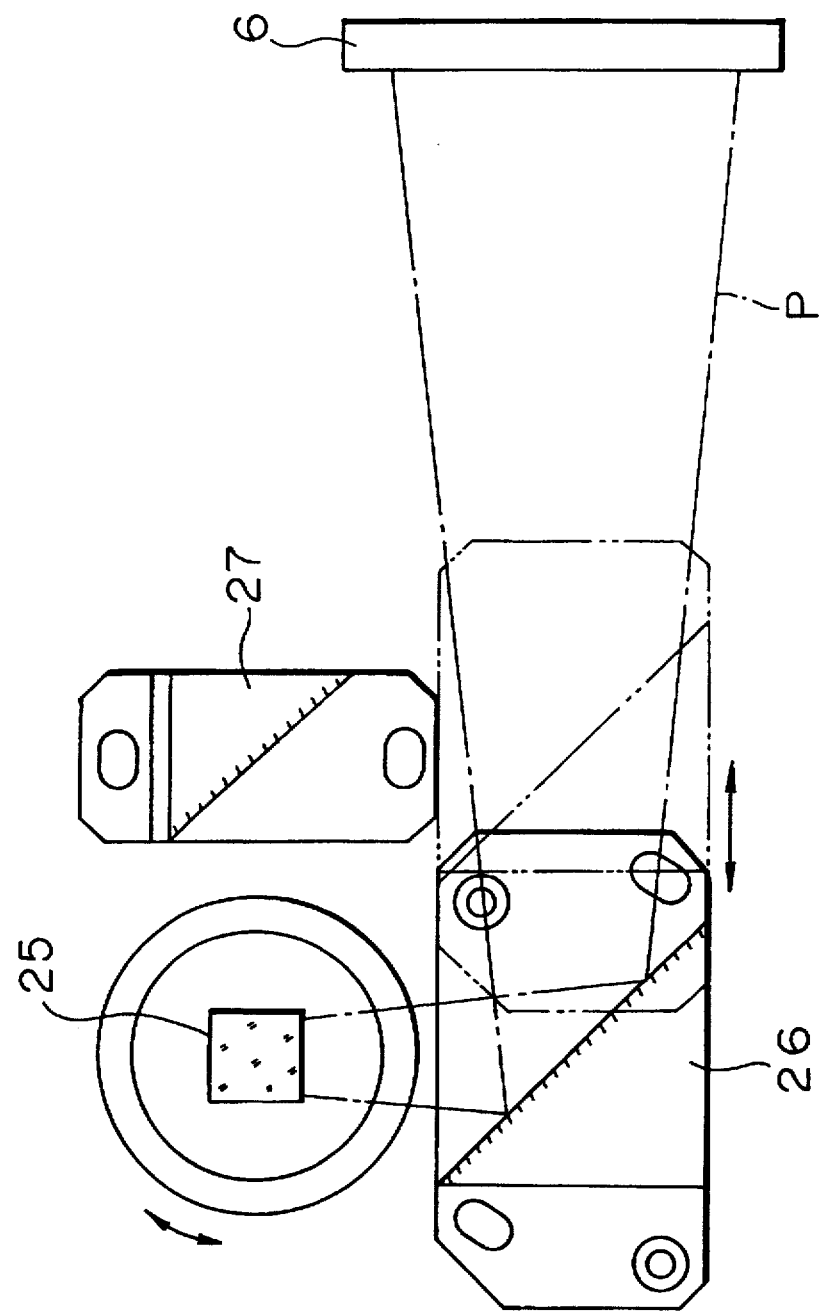
FIG. 8 is a diagram illustrating an arrangement of a reflective mirror of a second deflector according to a second embodiment of the present invention.

The above-mentioned rotating mirror 25 is designed so as to be capable of planar rotation of at least 90° in order that the direction of incidence of the rotating mirror 25 can be adjusted with respect to the movable mirror 26 or the stationary mirror 27 in FIG. 8. Regardless of this planar rotation, both fluxes of incident beam are applied to the movable lenses 16 and 17 (in a direction perpendicular to the plane of the drawing). The stationary mirror 27 is secured in position such that beam reflected therefrom are directed to the rotating mirror 25. The movable mirror 26 is designed so as to be movable along a parallel line connecting the rotating mirror 25 and the stationary mirror 27 such that beam reflected therefrom are directed to the rotating mirror 25 or the stationary mirror 27.

Figure 9:
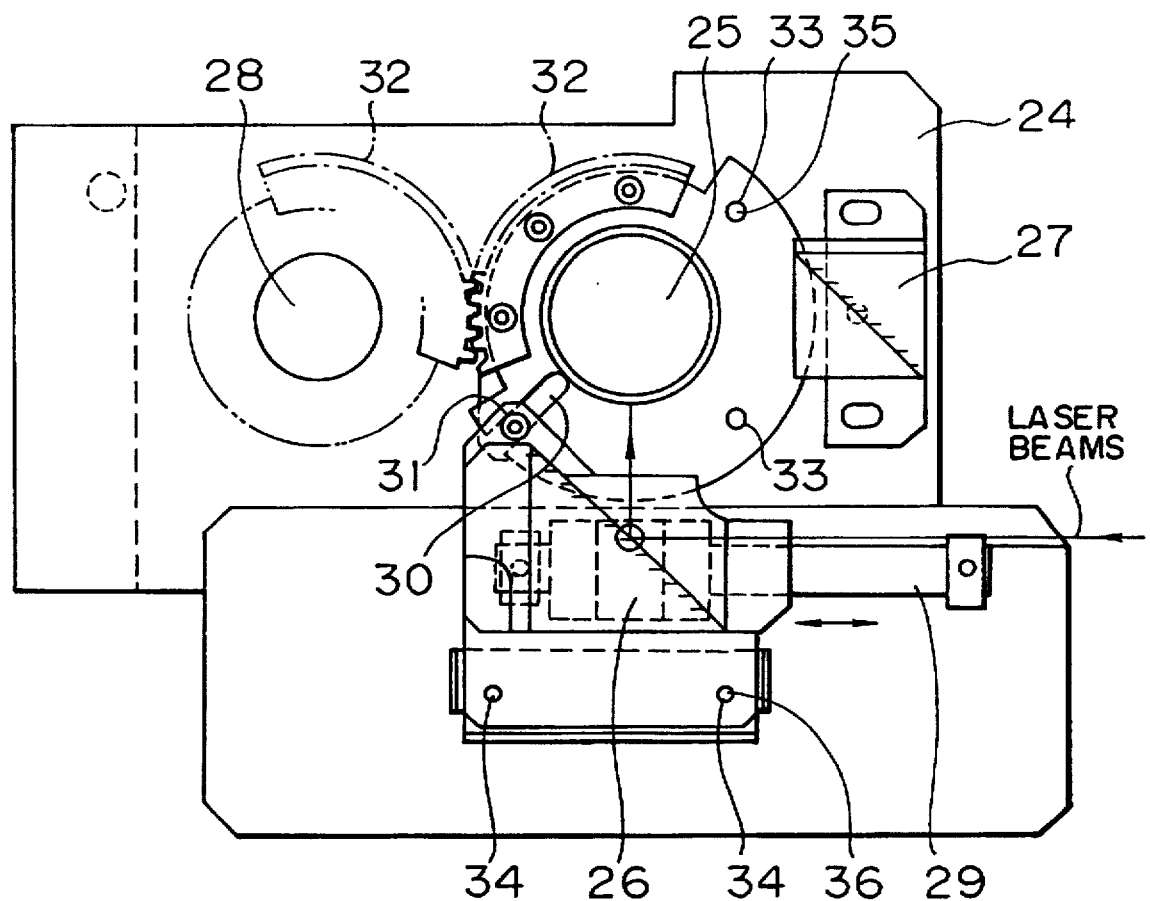
FIG. 9 is a plan view of a reflective mirror, showing a first optical path according to the second embodiment.
Figure 10:
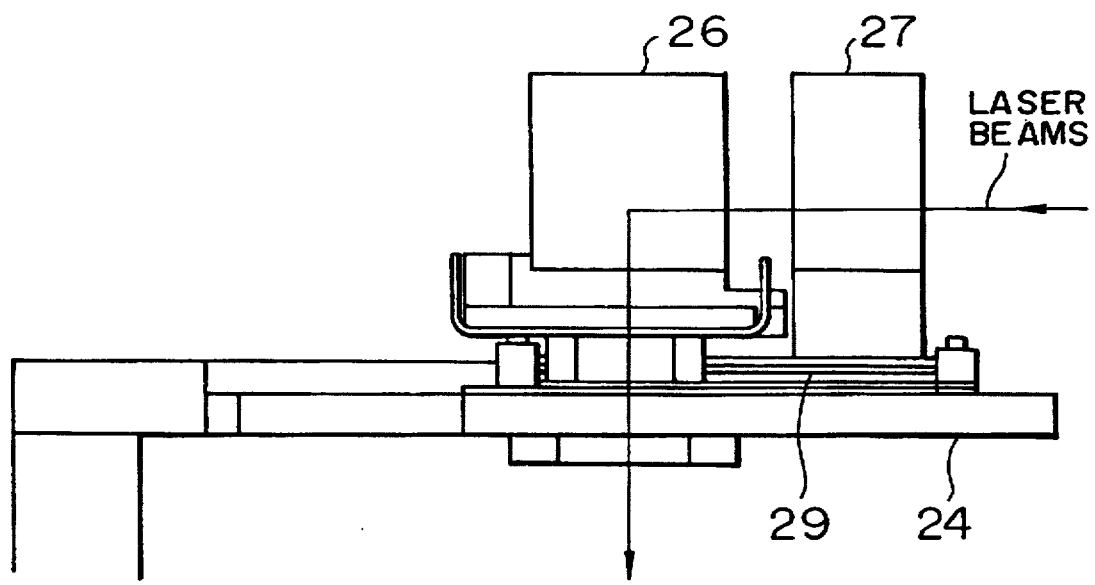
FIG. 10 is a side view of FIG. 9.
Figure 11:
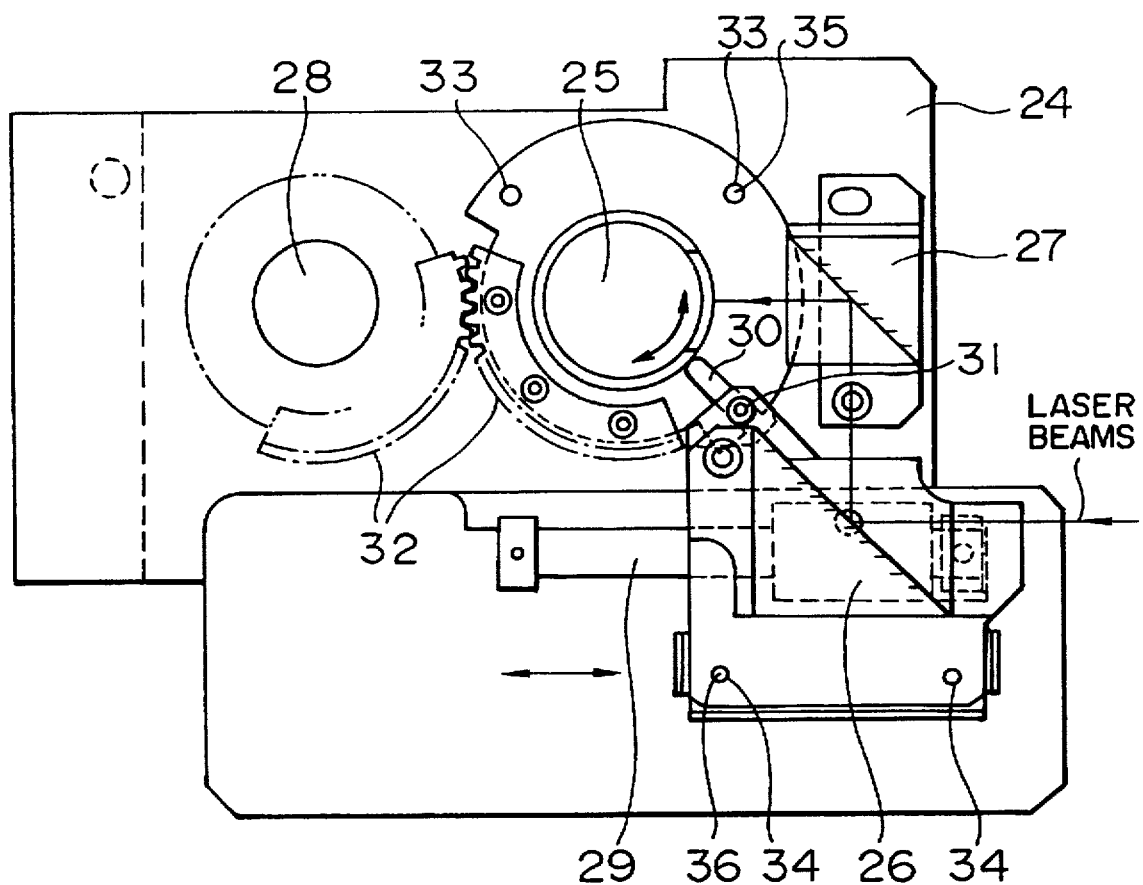
FIG. 11 is a plan view of a reflective mirror, showing a second optical path according to the second embodiment.

The second embodiment will be described specifically with reference to FIGS. 9 and 10, which show the first optical path, and FIGS. 11 and 12, which show the second optical path. The rotation of the rotating mirror 25, the movement of the movable mirror 26, and the fixation of the stationary mirror 27 are achieved by the following construction: these mirrors 25, 26 and 27 are mounted on a base 24. The outer periphery of the rotating mirror 25 is slidably fitted into a hole of the base 24, and is equipped with a gear 32 which is in mesh with a gear 32 of a motor 28. Thus, when the motor 28 makes normal or reverse rotation, the rotating mirror 25 also rotates. This rotating mirror 25 is designed such that it is rotatable at least 90°. Further, the movable mirror 26 is provided such that it is slidable on a rail 29 that is secured to the base 24. This rail 29 is parallel to a line connecting the center of rotation of the rotating mirror 25 and the center of the reflecting surface of the stationary mirror 27.

In the outer periphery of the case of the movable mirror 26, there is provided a pin 31, which is fitted into an elongated hole 30 provided in the outer periphery of the case of the rotating mirror 25, in such a way that it involves no rattling. Thus, when the rotating mirror 25 is rotated by the motor 28, the pin 31 receives a thrust from the wall of the elongated hole 30, whereby the movable mirror 26 moves to the right and left, as seen in the drawing, on the rail 29 with the rotation of the rotating mirror 25. Further, the case of the movable mirror 26 is provided with two holes 34, which are spaced apart from each other. The distance between these holes 34 corresponds to an optimum amount of displacement when the movable mirror 26 moves on the rail 29.

The base 24 has a pin 36 which is firmly secured thereto. At each of the stroke ends of the movable mirror 26, the pin 36 enters the hole 34 to thereby arrest the movable mirror 26. Though not shown, the pin 36 has a ball at its tip, which ball is outwardly biased by a spring. Due to this construction, the ball enters one of the two holes 34 at the stroke ends of the movable mirror 26 to thereby serve as a positioning lock for the movable mirror 26. Further, the rotating mirror 25 has two holes 33, which are spaced apart from each other. These holes 33 correspond to the rotating angle of 90° of the rotating mirror 25. A pin 35, which is secured to the base 24, is arranged so as to enter these holes 33 at the stroke ends of the movable mirrors 26, thus serving as a positioning lock for the rotating mirror 25. This pin 35 has a construction similar to that of the pin 36.

Figure 12:
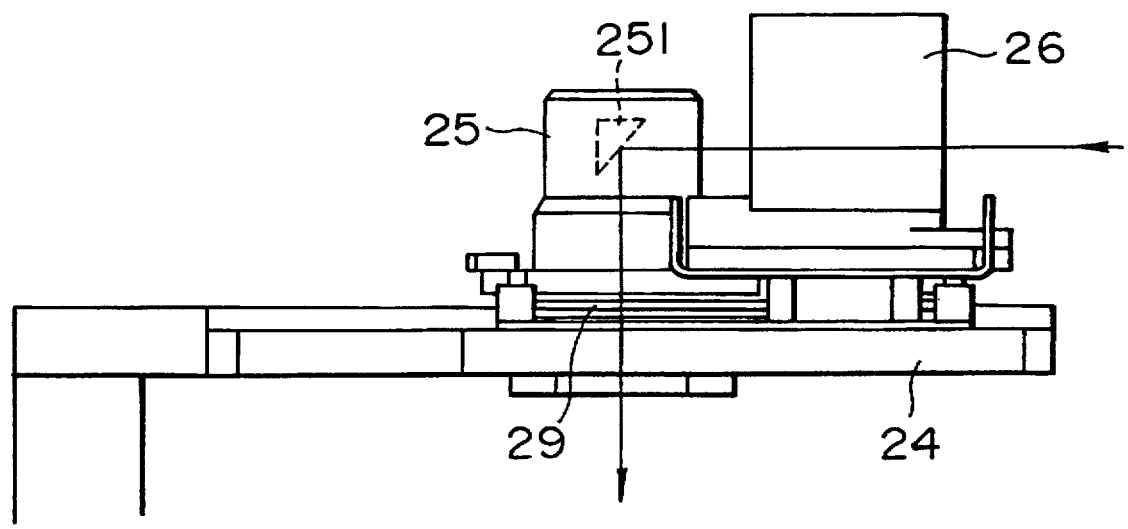
FIG. 12 is a side view of FIG. 11.

The rotating mirror 25 has a mirror 251 at its center of rotation (See FIG. 12). Thus, if the rotating mirror swings,' both of the incident fluxes of beam from the movable lens 26 and the stationary lens 27 can be applied to the movable lenses 16 and 17. That is, from the first optical path shown in FIGS. 9 and 10, the rotating mirror 25 can rotate 90° by the rotation of the motor 28 and, with this rotation, the movable mirror 26 moves to thereby realize the arrangement as shown in FIGS. 11 and 12, whereby the second optical path is obtained.

Due to this construction, it is possible, as in the first embodiment, to turn the image to be marked by 90° and, further, marking is possible even when workpieces are continuously conveyed. While this embodiment has been described with reference to a construction in which only one motor 28 is used to reliably and economically realize an interlocked movement of the rotating mirror 25 and the movable mirror 26, it goes without saying that it is also possible to use two motors and that, regarding the mirrors, it is possible to adopt mirrors of various other types and configurations.

Next, the third embodiment, in which the reflective mirror of the second deflector 9 (See FIG. 1) is designed in still another way, will be described with reference to FIGS. 13 through 16.

Figure 13:
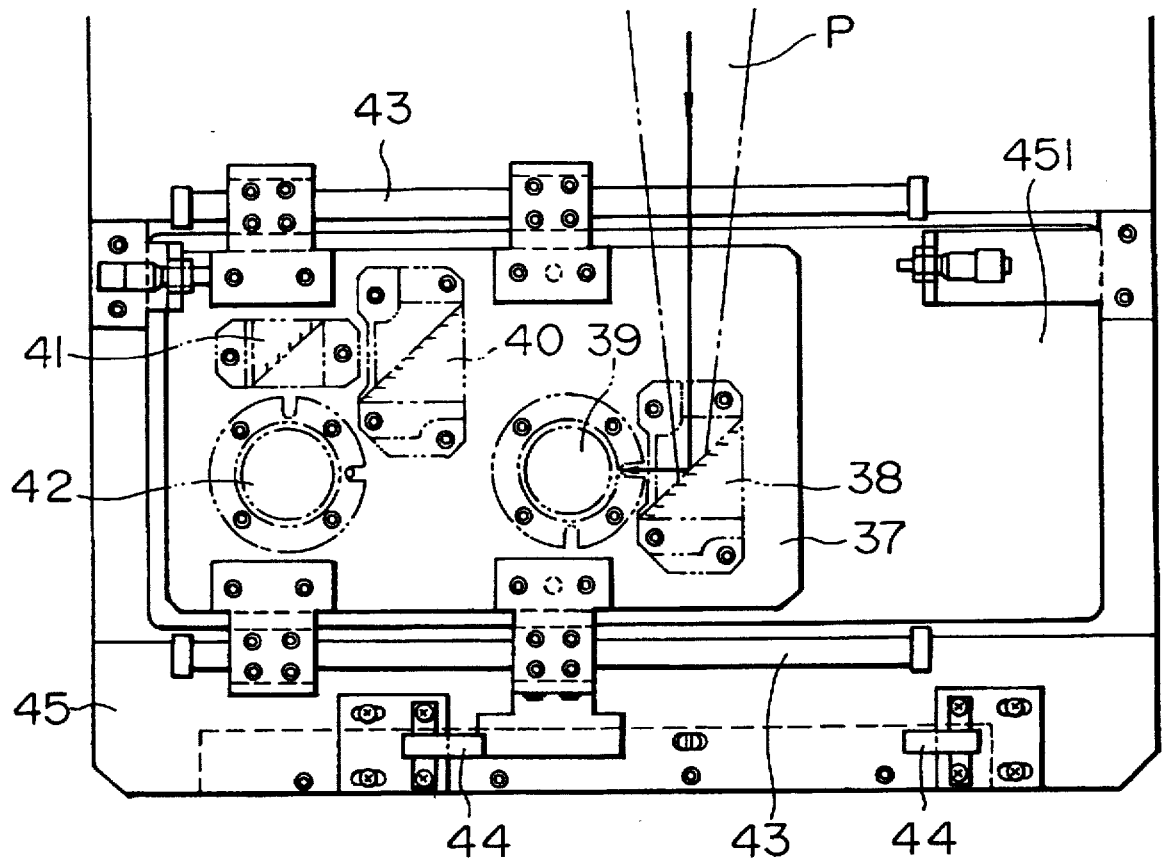
FIG. 13 is a plan view of a reflective mirror of a second deflector according to a third embodiment of the present invention, which corresponds to the first optical path.
Figure 14:
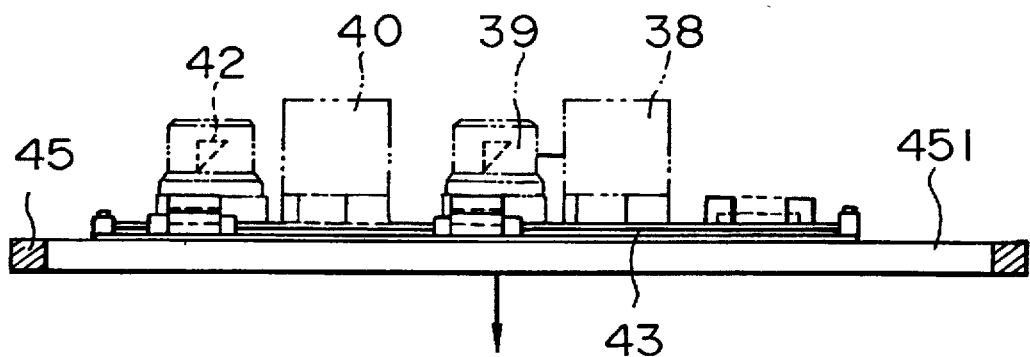
FIG. 14 is a side view of FIG. 13.
Figure 15:
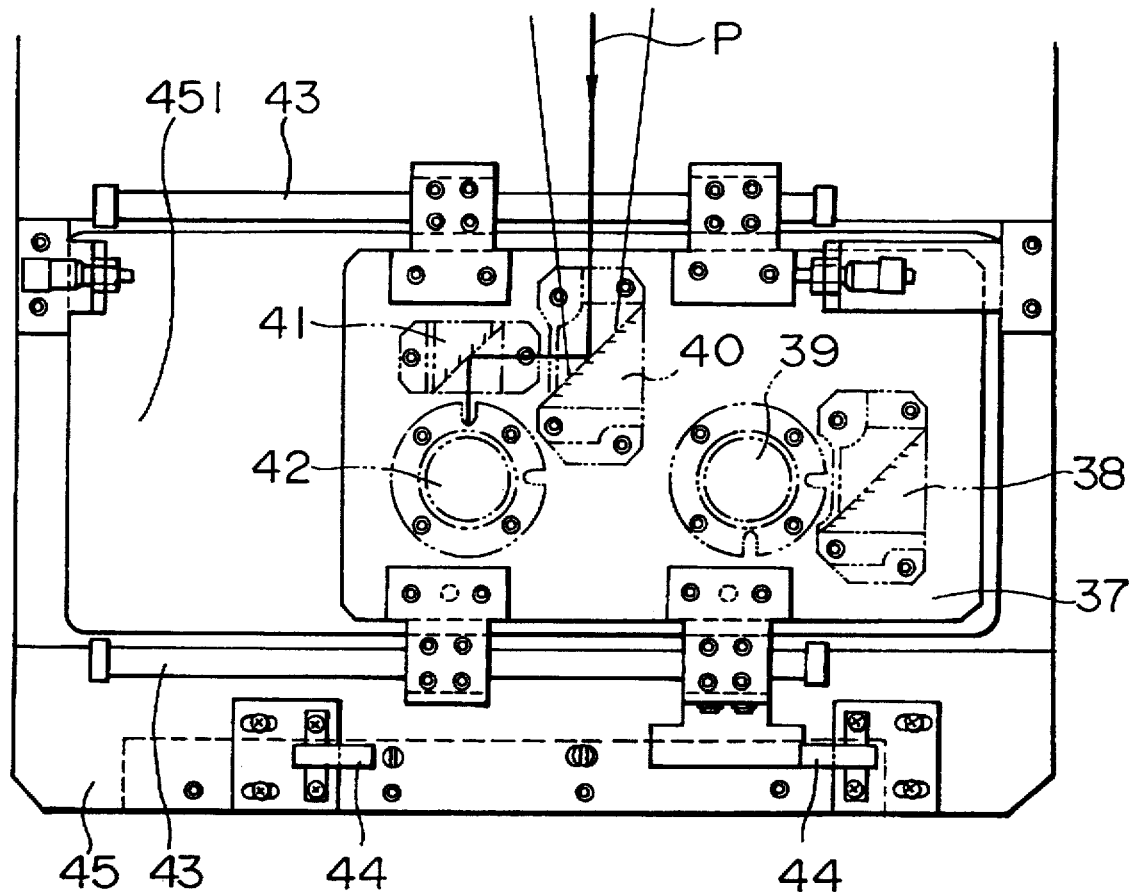
FIG. 15 is a plan view of a reflective mirror of the second deflector according to the third embodiment, which corresponds to the second optical path.
Figure 16:
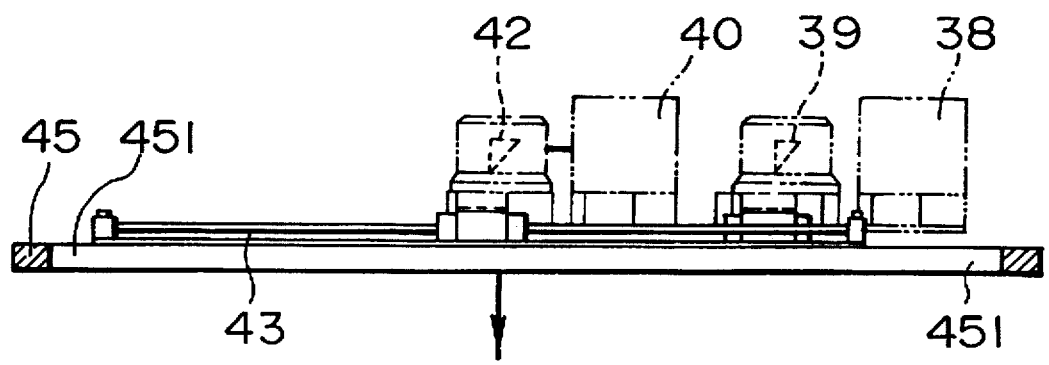
FIG. 16 is a side view of FIG. 15.

FIGS. 13 and 14 are diagrams corresponding to the above-described first optical path, and FIGS. 15 and 16 are diagrams corresponding to the above-described second optical path. Five reflective mirrors are secured to a movable base 37. These mirrors include a first mirror 38 for receiving and reflecting the laser beam P transmitted through the liquid crystal mask 6 (See FIG. 1), and a second mirror 39 for applying the reflected beam from the first mirror 38 to the movable lenses 16 and 17. The above five mirrors further include a third mirror 40 which, like the first mirror 38, receives and reflects a laser beam transmitted through the liquid crystal mask 6, a fourth mirror 41 for receiving and reflecting the reflected beam from the third mirror 40, and a fifth mirror 42 for applying the reflected beam from the fourth mirror 41 to the movable lenses 16 and 17. The laser beam P transmitted through the liquid crystal mask 6 can be switchably applied to the first mirror 38 or to the third mirror 40 according to the position of the displacement of the movable base 37.

Each of the second mirror 39 and the fifth mirror 42, which, from their appearance as shown in the drawings, have the same configuration as that of the rotating mirror 25 of the second embodiment, is obtained by removing the gear 32, etc., from the rotating mirror 25 of the second embodiment. Thus, unlike the rotating mirror 25 of the second embodiment, they do not rotate but are fastened to the movable base 37.

Further, the movable base 37 is arranged so as to be slidable on two parallel rails 43 fastened to a base 45. In the middle portion of the base 45, an elongated hole 451 is formed so that the laser beam can be applied to the movable lenses 16 and 17 from the second mirror 39 or the fifth mirror 42. Further, the movable base 37 is pin-connected to the base 45 by means of a direct driven type pneumatic cylinder (not shown), whereby it can move to the right and left as seen in the drawing by a predetermined stroke. This stroke is determined by positioning locks 44. For example, in the state shown in FIG. 13, the movable base 37 is secured in position by the left-hand side positioning lock 44. That is, the first mirror 38 and the second mirror 39 have substantially the same construction as the first optical path, as can be seen from the laser optical path shown in FIGS. 13 and 14.

Next, by driving a motor (not shown), the movable base 37 moves to the right as seen in the drawing, and is arrested by the right-hand side positioning lock 44. Thus, an arrangement as shown in FIGS. 15 and 16 is realized. That is, as can be seen from the laser optical path shown in FIGS. 15 and 16, the third mirror 40, the fourth mirror 41, and the fifth mirror 42 have substantially the same construction as the second optical path of the second embodiment.

Due to this construction, it is possible, as in the above-described embodiment, to turn the marked image by 90° and to achieve an improvement in terms of production efficiency. While in this embodiment the drive source for the movable base 37 consists of a direct driven type pneumatic cylinder, it is also possible to use a hydraulic cylinder, a solenoid, a motor and so on. Further, in the above construction, switching from the first optical path to the second optical path and switching reverse thereto involve an increase/decrease in the number of mirrors by one, so that the image formation on the workpiece surface involves reversing from left to right. Thus, it should be added that, when effecting the above change in optical path, the display of the image on the liquid crystal mask 6 is reversed from left to right beforehand.

INDUSTRIAL APPLICABILITY

In accordance with the present invention, a beam transmitted through a mask is switched by a reflective mirror so that the image to be marked can be turned by 90° and, further, laser marking is possible even when workpieces are being continuously conveyed, without having to stop them at intervals, whereby an apparatus for and a method of laser marking are provided which help to attain an improvement in production efficiency.

What is claimed is:

1. A laser marking apparatus comprising:

a laser generator, a first deflector for deflecting a laser beam from said laser generator to perform raster scanning, a mask capable of selectively allowing transmission of the laser beam from said first deflector for raster scanning to thereby display a predetermined pattern, and a second deflector for further deflecting the laser beam transmitted through said mask to apply it to a surface of a workpiece for marking, wherein said second deflector includes a reflective mirror device, for reflecting the laser beam transmitted through said mask, and movable lenses, for receiving the laser beam from this reflective mirror device to apply the thus received laser beam to the surface of the workpiece for marking, with the movable lenses being mounted on a moving mechanism which moves in synchronism with the speed at which the workpiece is conveyed, wherein said reflective mirror device comprises:

a first mirror for receiving and reflecting the laser beam transmitted through said mask, a second mirror for reflecting the reflected beam from the first mirror to said movable lenses, a third mirror for receiving and reflecting the laser beam transmitted through said mask, a fourth mirror for receiving and reflecting the reflected beam from the third mirror, and a fifth mirror for reflecting the reflected beam from the fourth mirror to said movable lenses, with the first through fifth mirrors being secured to a movable base, and the application of the laser beam transmitted through said mask being switchable, through displacement of said movable base, to the first mirror or to the third mirror.

2. A laser marking apparatus for marking a surface of a workpiece, said apparatus comprising:

a laser generator for providing a laser beam;

a first reflector for reflecting the laser beam provided by said laser generator so as to perform raster scanning;

a mask capable of selectively allowing transmission therethrough of the thus raster scanned laser beam, to thereby display a marking pattern;

a movable mirror adapted to receive and reflect the thus transmitted laser beam;

a rotatable mirror;

a stationary mirror which can receive the laser beam, which has been reflected from said movable mirror to said stationary mirror, and can reflect the beam, thus received from said movable mirror, to said rotatable mirror;

a movable lens for receiving the laser beam incident thereon and for applying the thus received incident laser beam to the surface of the workpiece, thereby marking said surface of the workpiece;

a reversible motor connected to said rotatable mirror for rotating said rotatable mirror in a normal direction to a first rotary position and in a reverse direction to a second rotary position;

said movable mirror being mounted for linear movement in a first direction to a first linear position and in a second direction, which is opposite to said first direction, to a second linear position, so that in said first linear position said movable mirror is adapted to receive and reflect said thus transmitted laser beam to said rotatable mirror, and in said second linear position said movable mirror is adapted to receive and reflect said thus transmitted laser beam to said stationary mirror;

a mechanism for moving said movable mirror in said first direction to said first linear position of said movable mirror when said motor rotates said rotatable mirror in said normal direction to said first rotary position and for moving said movable mirror in said second direction to said second linear position when said motor rotates said rotatable mirror in said reverse direction to said second rotary position;

wherein when said rotatable mirror is in said first rotary position and said movable mirror is in said first linear position, said rotatable mirror is adapted to reflect to said movable lens the laser beam which has been reflected from said movable mirror to said rotatable mirror; and wherein when said rotatable mirror is in said second rotary position and said movable mirror is in said second linear position, said rotatable mirror is adapted to reflect to said movable lens the laser beam which has been reflected from said movable mirror to said stationary mirror and then to said rotatable mirror.

3. A laser marking apparatus in accordance with claim 2, wherein said movable mirror is mounted on a rail for sliding movement along said rail in said first and second directions.

4. A laser marking apparatus in accordance with claim 3, wherein said rotatable mirror has a center of rotation, wherein said stationary mirror has a reflecting surface, and wherein said rail is positioned parallel to a line connecting said center of rotation of said rotatable mirror and a center of said reflecting surface of said stationary mirror.

5. A laser marking apparatus in accordance with claim 2, wherein said first and second rotary positions are at least 90° apart.

6. A laser marking apparatus in accordance with claim 2, wherein said movable mirror is positioned in a first case, wherein said rotatable mirror is positioned in a second case, and wherein said mechanism for moving said movable mirror comprises an elongated slot in a first one of said first and second cases, and a pin positioned in said slot and connected to a second one of said first and second cases, so that when said rotatable mirror and said second case is rotated by said motor a thrust is applied between a wall of said slot and said pin to move said movable mirror and said first case.

7. A laser marking apparatus in accordance with claim 2, further comprising a base and a case, said movable mirror being positioned in said case, and wherein one of said case and said base has a detent hole at each of said first and second linear positions and the other of said case and said base has a detent element for engaging one of said detent holes.

8. A laser marking apparatus in accordance with claim 2, further comprising a base and a case, said rotatable mirror being positioned in said case, and wherein one of said case and said base has a detent hole at each of said first and second rotary positions and the other of said case and said base has a detent element for engaging one of said detent holes, to serve as a positioning lock for the rotatable mirror.

9. A laser marking apparatus in accordance with claim 2, wherein said movable mirror is mounted on a rail for sliding movement along said rail in said first and second directions, wherein said rotatable mirror has a center of rotation, wherein said stationary mirror has a reflecting surface, and wherein said rail is positioned parallel to a line connecting said center of rotation of said rotatable mirror and a center of said reflecting surface of said stationary mirror; and wherein said movable mirror is positioned in a first case, wherein said rotatable mirror is positioned in a second case, and wherein said mechanism for moving said movable mirror comprises an elongated slot in a first one of said first and second cases, and a pin positioned in said slot and connected to a second one of said first and second cases, so that when said rotatable mirror and said second case is rotated by said motor a thrust is applied between a wall of said slot and said pin to move said movable mirror and said first case.

10. A laser marking apparatus in accordance with claim 9, further comprising a base; wherein said first and second rotary positions are at least 90° apart; wherein one of said first case and said base has a detent hole at each of said first and second linear positions and the other of said case and said base has a detent element for engaging one of said detent holes at the first and second linear positions; and wherein one of said second case and said base has a detent hole at each of said first and second rotary positions and the other of said second case and said base has a detent element for engaging one of the detent holes at the first and second rotary positions to serve as a positioning lock for the rotatable mirror.

11. A laser marking apparatus in accordance with claim 2, wherein said workpiece is conveyed along a path in a workpiece conveying direction at a workpiece conveying speed, and further comprising a moving mechanism which moves in synchronism with said workpiece conveying speed, said movable lens being mounted on said moving mechanism for movement therewith so that the surface of the workpiece can be marked as the workpiece is conveyed along said path at said workpiece conveying speed without having to stop the conveying of the workpiece for the marking of the workpiece.

12. A laser marking apparatus in accordance with claim 11, wherein said moving mechanism comprises an orthogonal biaxial planar moving mechanism having two orthogonal axes of movement, with a first one of said two orthogonal axes being aligned with said workpiece conveying direction and a second one of said two orthogonal axes being perpendicular to said workpiece conveying direction, and wherein said orthogonal biaxial planar moving mechanism can move said movable lens along said each of said two orthogonal axes with movement along said first one being at a speed which is in synchronism with said workpiece conveying speed.

13. A laser marking apparatus for marking a surface of a workpiece, said apparatus comprising:

a laser generator for generating a laser beam;

a deflector for deflecting the laser beam from said laser generator so as to perform raster scanning;

a mask capable of selectively allowing transmission therethrough of the thus raster scanned laser beam, to thereby display a marking pattern;

a movable lens for receiving the laser beam incident thereon and for applying the thus received laser beam to the surface of the workpiece as the workpiece is conveyed along said path in said workpiece conveying direction at said workpiece conveying speed;

a first mirror adapted to receive and reflect the laser beam thus transmitted by said mask;

a second mirror for receiving the beam reflected from said first mirror and for reflecting the beam, thus received by said second mirror from said first mirror, to said movable lens;

a third mirror adapted to receive and reflect the laser beam thus transmitted by said mask;

a fourth mirror for receiving the beam reflected from said third mirror and for reflecting the beam, thus received by said fourth mirror from said third mirror;

a fifth mirror for receiving the beam reflected from said fourth mirror and for reflecting the beam, thus received by said fifth mirror from said fourth mirror, to said movable lens; and a movable base, said first, second, third, fourth, and fifth mirrors being secured to said movable base for movement therewith; wherein said movable base has a first position and a second position so that in said first position the laser beam transmitted by said mask is received by said first mirror and is reflected by said first mirror to said second mirror and the beam received by said second mirror is directed to said movable lens; and in said second position the laser beam transmitted by said mask is received by said third mirror and is reflected by said third mirror to said fourth mirror, the beam received by said fourth mirror is reflected to said fifth mirror, and the beam received by said fifth mirror is directed to said movable lens.

14. A laser marking apparatus in accordance with claim 13, further comprising a moving mechanism which moves in synchronism with said workpiece conveying speed, said movable lens being mounted on said moving mechanism for movement therewith so that the surface of the workpiece can be marked as the workpiece is conveyed along said path at said workpiece conveying speed without having to stop the conveying of the workpiece for the marking of the workpiece.

15. A laser marking apparatus in accordance with claim 14, wherein said moving mechanism comprises an orthogonal biaxial planar moving mechanism having two orthogonal axes of movement, with one of said two orthogonal axes coinciding with said workpiece conveying direction, and wherein said orthogonal biaxial planar moving mechanism can move said movable lens along said one of said two orthogonal axes at a speed which is in synchronism with said workpiece conveying speed.

16. A laser marking apparatus in accordance with claim 13, further comprising a fixed base and first and second rails mounted on said fixed base so as to be parallel to each other, wherein said movable base is mounted on said rails for linear movement in first and second directions between first and second limits.

17. A laser marking apparatus in accordance with claim 16, further comprising first and second positioning elements to establish said first and second limits.

* * * * *